(12) United States Patent
Sekine

(10) Patent No.: US 11,159,740 B2
(45) Date of Patent: Oct. 26, 2021

(54) IMAGE CAPTURING DEVICE AND CONTROL METHOD THEREOF AND MEDIUM

(71) Applicant: CANON KABUSHIKI KAISHA, Tokyo (JP)

(72) Inventor: Hisato Sekine, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/707,377

(22) Filed: Dec. 9, 2019

(65) Prior Publication Data
US 2020/0195857 A1    Jun. 18, 2020

(30) Foreign Application Priority Data
Dec. 12, 2018  (JP) .............................. JP2018-232835

(51) Int. Cl.
*H04N 5/243* (2006.01)
*H04N 5/235* (2006.01)
*H04N 5/355* (2011.01)
*H04N 9/04* (2006.01)

(52) U.S. Cl.
CPC .......... *H04N 5/243* (2013.01); *H04N 5/2351* (2013.01)

(58) Field of Classification Search
CPC .. H04N 5/243; H04N 5/2351; H04N 5/35563; H04N 5/35554; H04N 9/04551; H04N 5/235; H04N 5/2352; H04N 5/2353; H04N 5/23254; H04N 5/23251; H04N 5/2356; H04N 5/2355
See application file for complete search history.

(56) References Cited

U.S. PATENT DOCUMENTS

| 10,027,897 | B2 |  | 7/2018 | Sekine | |
|---|---|---|---|---|---|
| 2009/0230288 | A1 | * | 9/2009 | Blaesing | H04N 5/35554 250/208.1 |
| 2010/0141792 | A1 | * | 6/2010 | Arai | H04N 5/3745 348/229.1 |
| 2012/0257079 | A1 | * | 10/2012 | Ninan | H04N 5/222 348/222.1 |
| 2013/0162855 | A1 | * | 6/2013 | Kannermark | H04N 5/2355 348/222.1 |
| 2013/0293752 | A1 | * | 11/2013 | Peng | H04N 5/3535 348/295 |
| 2015/0116525 | A1 | * | 4/2015 | Peng | H04N 5/23254 348/218.1 |

(Continued)

FOREIGN PATENT DOCUMENTS

| JP | 2010136205 A | 6/2010 |
|---|---|---|
| JP | 2011004089 A | 1/2011 |

*Primary Examiner* — Albert H Cutler
(74) *Attorney, Agent, or Firm* — Carter, DeLuca & Farrell LLP

(57) ABSTRACT

There is provided with an image capturing device. An image capturing unit is capable of controlling an exposure condition for each region. A first acquisition unit acquires information representing a moving object region within an imaging range of the image capturing unit. A second acquisition unit acquires brightness information of each region within the imaging range of the image capturing unit. A setting unit sets the exposure condition used by the image capturing unit for each region by using the information representing the moving object region and the brightness information.

18 Claims, 9 Drawing Sheets

(56) References Cited

U.S. PATENT DOCUMENTS

| | | | | |
|---|---|---|---|---|
| 2015/0130959 A1* | 5/2015 | Kao | ...................... | H04N 5/2353 |
| | | | | 348/218.1 |
| 2017/0359524 A1* | 12/2017 | Hosono | .................. | H04N 5/772 |
| 2018/0137375 A1* | 5/2018 | Takemura | .............. | H04N 5/238 |
| 2019/0052788 A1* | 2/2019 | Liu | .................... | H04N 5/23258 |

* cited by examiner

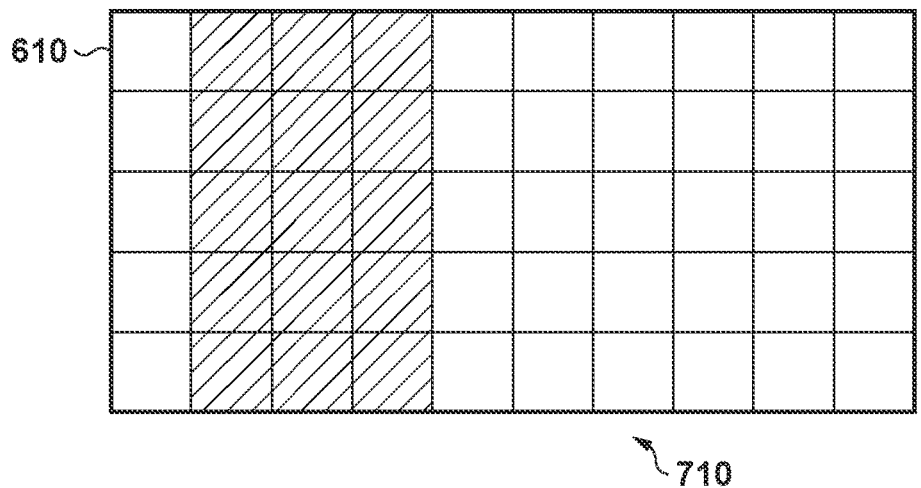

FIG. 8

| EXPOSURE VALUE (EV) | ACCUMULATION PERIOD (1/s) | READ GAIN (x) | APERTURE (F) |
|---|---|---|---|
| 1 | 30 | 8 | 22 |
| 2 | 60 | 8 | 22 |
| 3 | 120 | 8 | 22 |
| 4 | 240 | 8 | 22 |
| 5 | 480 | 8 | 22 |
| 6 | 960 | 8 | 22 |
| 7 | 1920 | 8 | 22 |
| ... | ... | ... | ... |
| Ev max | 16000 | 1 | 2.0 |

FIG. 9

| 14 | 14 | 10 | 10 | 14 | 14 | 14 | 8 | 14 | 14 |
|---|---|---|---|---|---|---|---|---|---|
| 14 | 14 | 10 | 10 | 14 | 14 | 14 | 8 | 14 | 14 |
| 14 | 14 | 10 | 10 | 14 | 14 | 14 | 8 | 14 | 14 |
| 14 | 14 | 10 | 10 | 14 | 14 | 14 | 8 | 14 | 14 |
| 14 | 14 | 10 | 10 | 14 | 14 | 14 | 8 | 14 | 14 |

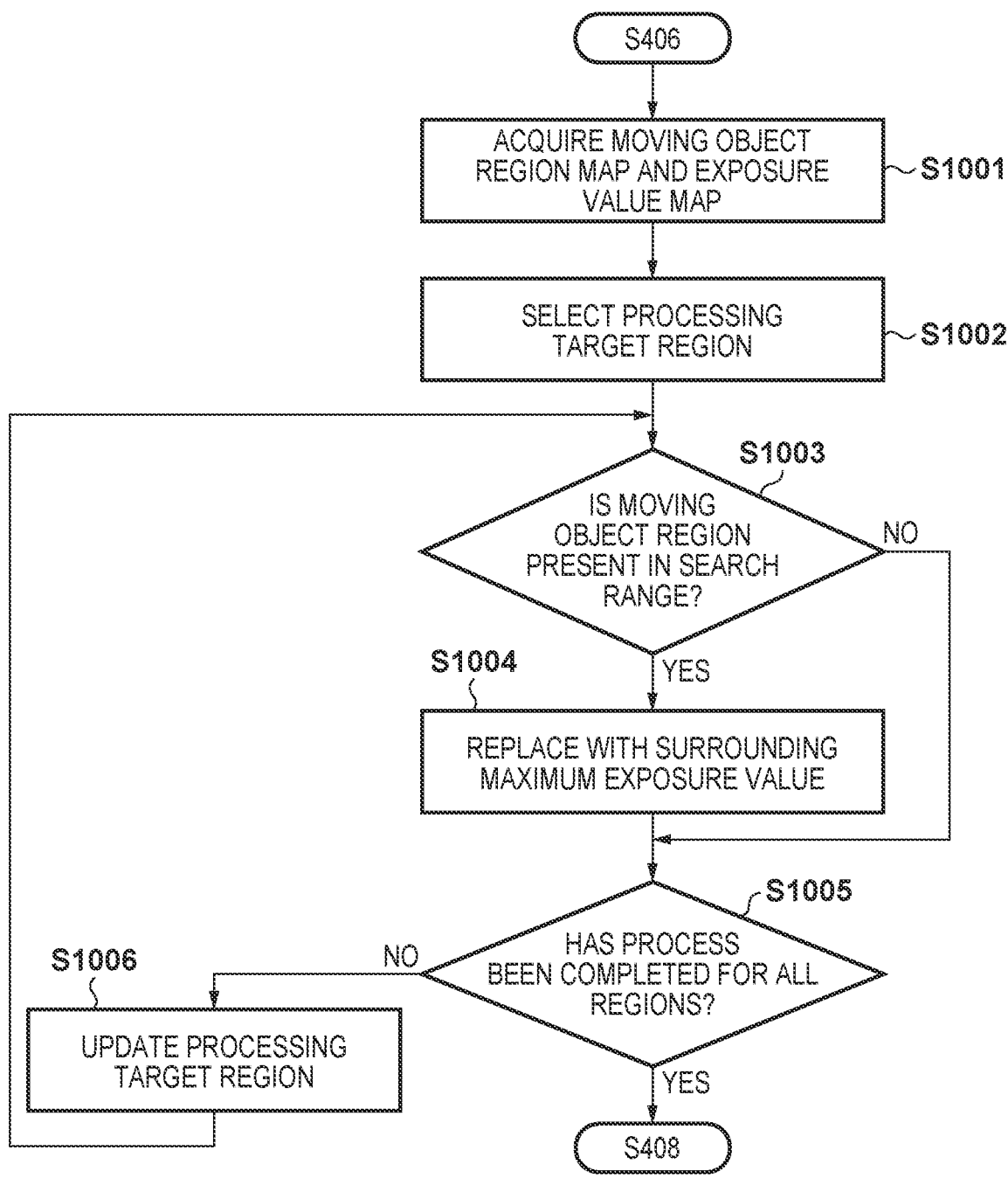

IMAGE CAPTURING DEVICE AND CONTROL METHOD THEREOF AND MEDIUM

BACKGROUND OF THE INVENTION

Field of the Invention

The present invention relates to an image capturing device and a control method thereof and a medium, and particularly relates to an exposure condition control of an image capturing element in which the exposure condition can be controlled for each region.

Description of the Related Art

The dynamic range of image capturing elements such as a CCD and a CMOS used in image capturing devices such as digital cameras and digital video cameras is narrower than the dynamic range of nature. As such, capturing a subject having a wide dynamic range (referred to as a high dynamic range and abbreviated as "HDR" herein) may result in shadow detail loss or blown-out highlight.

To solve such a problem, Japanese Patent Laid-Open No. 2010-136205 proposes using a sensor in which the exposure condition such as the accumulation period can be controlled for each region on the basis of preliminary image capturing. Further, Japanese Patent Laid-Open No. 2011-4089 proposes a technique in which an image region is classified into a low exposure region and a high exposure region on the basis of preliminary image capturing, and further, the boundary portion of the regions is changed to the low exposure region to thereby prevent blown-out highlight in the boundary portion.

SUMMARY OF THE INVENTION

According to an embodiment of the present invention, an image capturing device comprises: an image capturing unit capable of controlling an exposure condition for each region; a first acquisition unit configured to acquire information representing a moving object region within an imaging range of the image capturing unit; a second acquisition unit configured to acquire brightness information of each region within the imaging range of the image capturing unit; and a setting unit configured to set the exposure condition used by the image capturing unit for each region by using the information representing the moving object region and the brightness information.

According to another embodiment of the present invention, a control method of an image capturing device, comprises: acquiring information representing a moving object region within an imaging range of the image capturing device, the image capturing device capable of controlling an exposure condition for each region; acquiring brightness information of each region within the imaging range of the image capturing device; and setting the exposure condition used by the image capturing device for each region by using the information representing the moving object region and the brightness information.

According to still another embodiment of the present invention, a non-transitory computer-readable medium stores a program which, when executed by a computer comprising a processor and a memory, causes the computer to perform: acquiring information representing a moving object region within an imaging range of an image capturing device, the image capturing device capable of controlling an exposure condition for each region; acquiring brightness information of each region within the imaging range of the image capturing device; and setting the exposure condition used by the image capturing device for each region by using the information representing the moving object region and the brightness information.

Further features of the present invention will become apparent from the following description of exemplary embodiments (with reference to the attached drawings).

BRIEF DESCRIPTION OF THE DRAWINGS

FIGS. 7A to 7C are explanatory diagrams of a method of correcting an exposure value for each region.

FIG. 8 is a diagram illustrating an exemplary table of a correspondence between an exposure value and an exposure condition.

FIG. 9 is an explanatory diagram of a method of correcting an exposure value for each region.

FIG. 10 is a flowchart of an exposure condition correction process (step S409).

DESCRIPTION OF THE EMBODIMENTS

Figure 1:
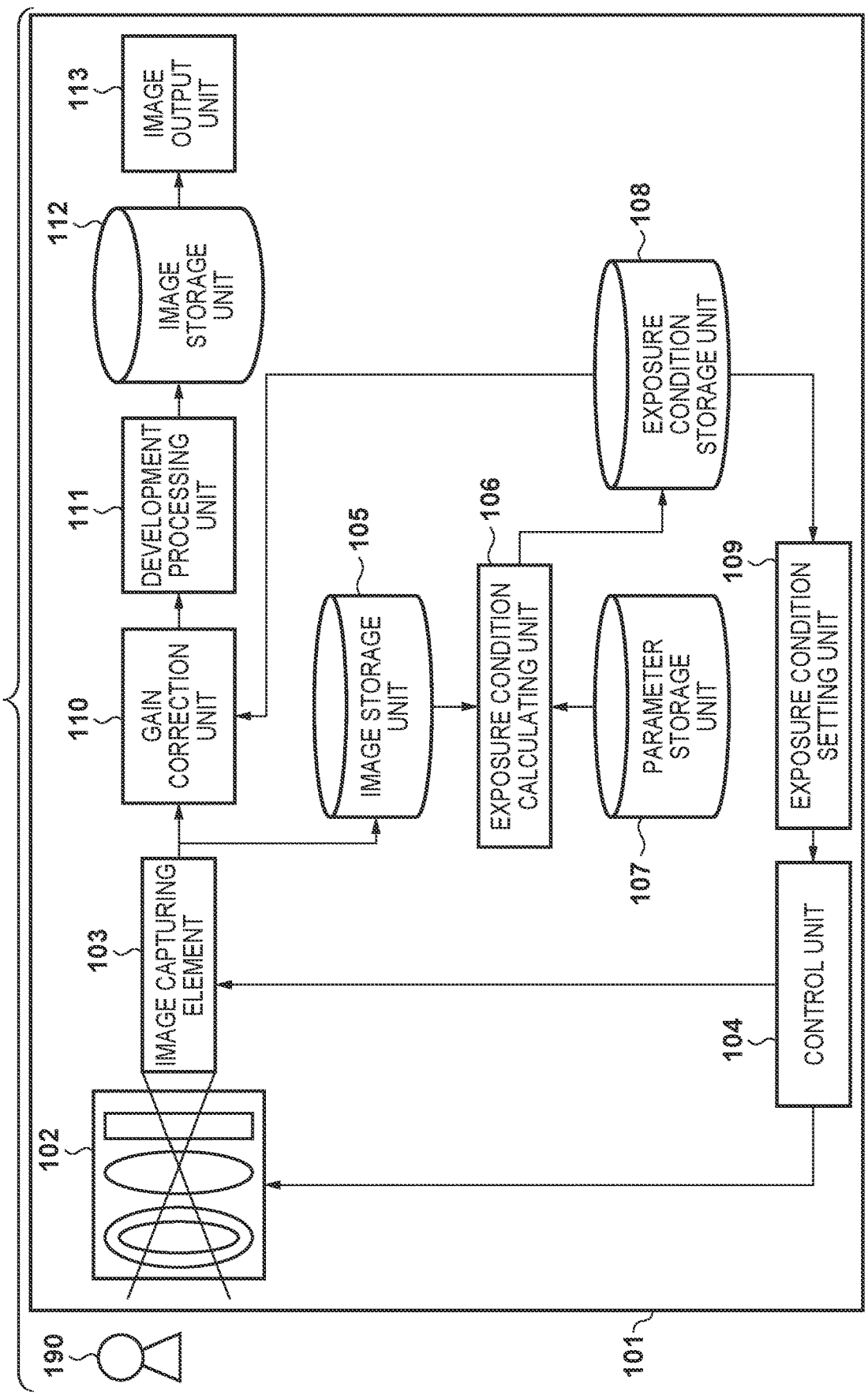
FIG. 1 is a block diagram illustrating an exemplary configuration of an image capturing device according to one embodiment.

From a study by the inventors of the present application, it was found that while the method disclosed in Japanese Patent Laid-Open No. 2011-4089 is effective in preventing the blown-out highlight in a moving object region where a moving subject is present, the method entails significant reduction in S/N ratio in a stationary object region where no moving subject is present.

An embodiment of the present invention relates to an image capturing element in which the exposure can be controlled for each region, and can control the exposure so as to suppress the reduction in S/N ratio while suppressing the occurrence of blown-out highlight.

Embodiments of the present invention will be described below with reference to the drawings. However, the embodiments described below do not limit the present invention, and all the combinations of the features described in a present embodiment may not be essential for the present invention. The present invention, on the other hand, encompasses combinations of the features described in different embodiments. In the following, the same reference signs are assigned to the same or similar configurations, and descriptions thereof may be omitted.

Embodiment 1

An image capturing device according to Embodiment 1 includes an image capturing unit capable of controlling the exposure condition for each region. For example, the image capturing unit includes an image capturing element (sensor), and can control the exposure condition for each region of the image capturing element. The image capturing device according to the present embodiment controls the exposure condition for each region by using information representing a moving object region within the imaging range of the image capturing unit. With such a configuration, a reduction in S/N ratio in a stationary object region including no movement can be suppressed while preventing the blown-out highlight in a moving object region including a movement. The following describes such an image capturing device and a method of controlling the same.

In the specific embodiments described below, the image capturing unit includes an image capturing element in which the accumulation period can be set for each region. The image capturing unit performs preliminary image capturing under a uniform exposure condition for each region to acquire two consecutive preliminarily captured images. Then, on the basis of the moving object region and the luminance distribution determined using the preliminarily captured images, the exposure condition for each region in the main image capturing is determined. For example, in the specific embodiments described below, the exposure condition for a region where the moving object region is present in the vicinity is changed to a darkest exposure condition (the exposure or the light reception amount is reduced) in the exposure conditions determined based on the luminance distribution for the surrounding region. However, it should be noted that the invention is not limited to the specific embodiments.

FIG. 1 illustrates an exemplary configuration of an image capturing device 101 according to Embodiment 1. The image capturing device 101 according to the present embodiment includes configurations indicated by reference numerals 102 to 113 in FIG. 1. An image capturing unit included in the image capturing device 101 includes an optical system 102 and an image capturing element 103. The optical system 102 includes an optical element configured to form an image of a subject 190 on the image capturing element 103, and includes, for example, a shutter, a lens, a diaphragm, an optical low-pass filter, and the like. The image capturing element 103 converts optical information representing the subject image formed on the image capturing element 103 to digital information. The image capturing element 103 may be a CMOS, for example. The image capturing element 103 may be a color image capturing element and may have a color filter.

Further, the image capturing element 103 is configured such that the exposure condition can be controlled for each region. The exposure condition is a parameter for controlling the amount of light that impinges on each pixel of the image capturing device and is detected by the image capturing element 103, or the amount of the charge that is accumulated in each pixel of the image capturing element. The exposure condition includes, for example, the charge accumulation period. Each element detects the amount of incident light in the set accumulation period, i.e., the charge corresponding to the amount of light accumulates. In the following, a large exposure of the image capturing element 103 means that the image capturing element 103 can accumulate a greater amount of charge for the same incident light. On the other hand, the exposure value is a parameter for controlling the brightness of an image obtained by the image capturing element 103. The exposure value may be, for example, an EV value, and the larger the value, the darker the image. The exposure value depends on the aperture value, the accumulation period, and the sensitivity (e.g., the ISO sensitivity, or the read gain from the image capturing element 103).

An exposure condition calculating unit 106 described later can control the charge accumulation period of the image capturing element 103 as an exposure condition. Note that, in the image capturing element 103, the exposure condition may be controllable for each region composed of a predetermined pixel block (e.g., 64×64 pixels), or the exposure condition may be controllable for each one of pixels.

A control unit 104 controls the image capturing operation by driving the optical system 102 and the image capturing element 103.

The exposure condition calculating unit 106 acquires information representing the moving subject region within the imaging range of the image capturing unit. The exposure condition calculating unit 106 acquires the brightness information of each region within the imaging range of the image capturing unit. Further, by using the information representing the moving subject region and the brightness information, the exposure condition calculating unit 106 sets the exposure condition used by the image capturing unit for each region.

The configurations indicated by reference numerals 105 and 107 to 110 are configurations for supporting the process of the exposure condition calculating unit 106 according to the present embodiment. An image storage unit 105 stores two preliminarily captured images obtained by preliminary image capturing prior to the main image capturing. In the present embodiment, the exposure condition calculating unit 106 acquires the information representing the moving subject region and the brightness information by using the two preliminarily captured images.

A parameter storage unit 107 stores a parameter that is referred to by the exposure condition calculating unit 106 to set the exposure condition. An exposure condition storage unit 108 stores the exposure condition of each region calculated by the exposure condition calculating unit 106. An exposure condition setting unit 109 performs a setting for image capturing in accordance with the exposure condition of each region stored in the exposure condition storage unit 108, and the control unit 104 controls the main image capturing operation in accordance with this setting.

A gain correction unit 110 performs gain correction for each region on the data obtained from the image capturing element 103 by the main image capturing in accordance with the exposure condition for each region stored in the exposure condition storage unit 108. With such a configuration, the image capturing device 101 can control, for each region, the gain that is applied to the signal from the image capturing element 103.

The configurations indicated by reference numerals 111 to 113 are configurations for processing the obtained data after performing the main image capturing. A development processing unit 111 generates a main captured image by performing a development process on the data that has been subjected to the gain correction by the gain correction unit 110. The development process may include a white balance correction process, a Debayer process, a noise reduction process, a sharpness process, a gamma correction, and the like. An image storage unit 112 stores data of the main captured image obtained by the development processing unit 111. An image output unit 113 outputs the data of the main captured image stored in the image storage unit 112 to an external device. The image output unit 113 can output the data of the main captured image to a printer, a display, or a storage medium such as a memory card via a cable and the like, for example.

Figure 2:
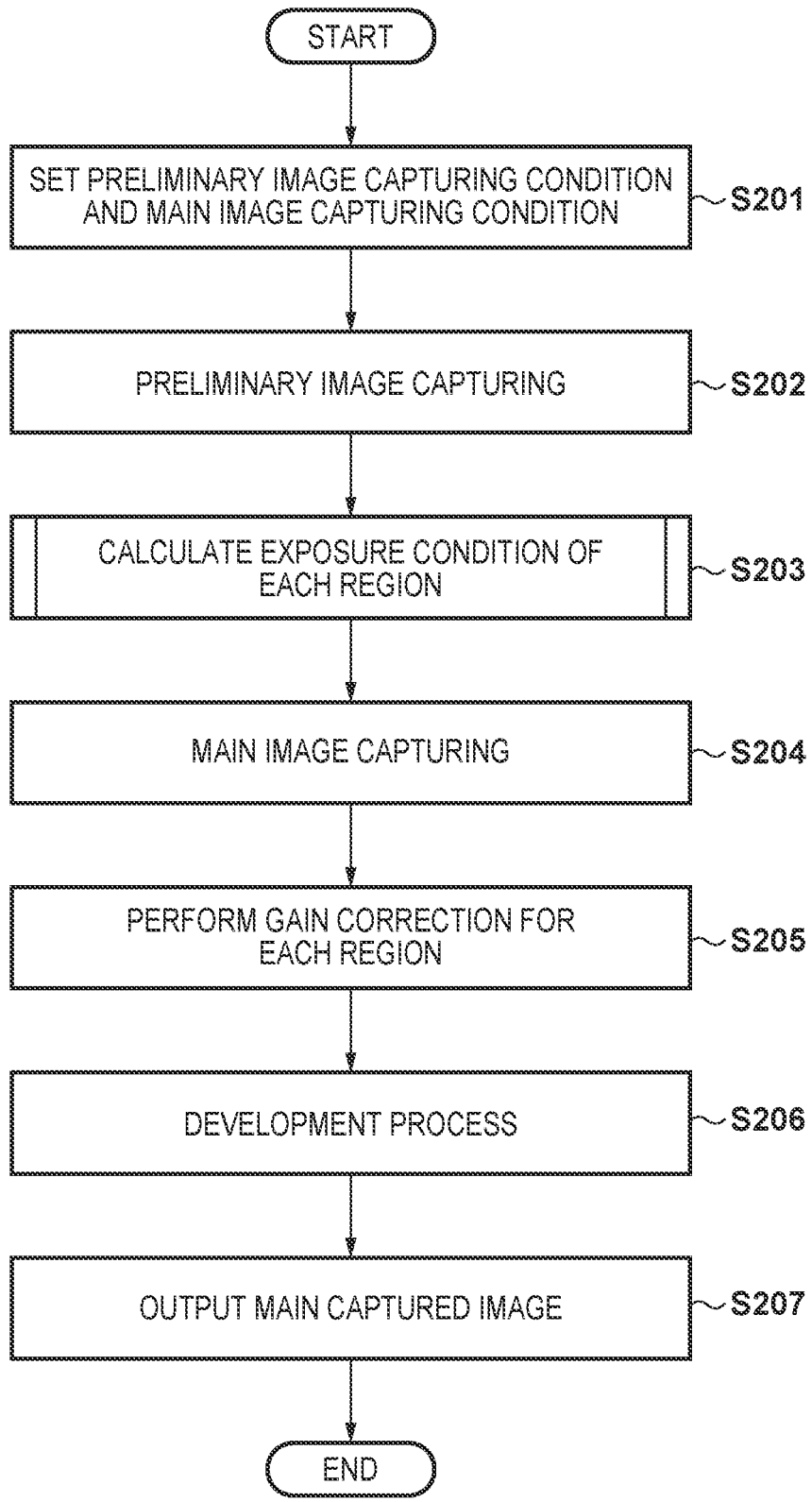
FIG. 2 is a flowchart of a control method according to one embodiment.

FIG. 2 is a flowchart illustrating the entire flow of a process performed by the image capturing device 101 according to the present embodiment. At step S201, the control unit 104 sets the image capturing condition used for the preliminary image capturing and the main image capturing. The image capturing condition includes image capturing parameters (such as the sensitivity, the exposure value, and the control parameters of the optical system 102 such as the aperture value) for the entire capturing image. Note that while the exposure condition in the preliminary image capturing and the exposure condition corresponding to the entire main captured image can be set at step S201, the exposure condition of each region in the main image capturing is further controlled at step S203. The control unit 104 can perform these settings in accordance with user input, for example.

At step S202, the control unit 104 performs the preliminary image capturing by driving the optical system 102 and the image capturing element 103 in accordance with the image capturing condition set at step S201. The control unit 104 generates a plurality of preliminarily captured images through the preliminary image capturing, and stores the preliminarily captured images in the image storage unit 105. In the preliminary image capturing, the image capturing can be performed using the same exposure condition for each region. For example, in response to acquisition of an instruction to perform the main image capturing, the control unit 104 can perform the preliminary image capturing two times at a predetermined time interval before the main image capturing.

At step S203, the exposure condition calculating unit 106 determines the exposure condition for the main image capturing for each region by using the plurality of preliminarily captured images stored in the image storage unit 105 and the parameter stored in the parameter storage unit 107, and stores the determined exposure condition in the exposure condition storage unit 108. In the present embodiment, the exposure condition calculating unit 106 determines the accumulation period for each region. Specific examples of the process will be described later.

At step S204, the control unit 104 performs the main image capturing by using exposure conditions differing among regions by driving the image capturing element 103 in accordance with the exposure condition for each region stored in the exposure condition storage unit 108.

At step S205, the gain correction unit 110 performs gain correction for the data obtained in the main image capturing at step S204 for each region. For example, the gain correction unit 110 can compensate for the difference in the exposure among the regions by determining the gain corresponding to the exposure value. The gain correction may be performed in accordance with the following equations, for example.

$$C' = a\_i \cdot C (C=R, G, B)$$

$$a\_i = 2.0^{\wedge}(EV\_i - EV\_0)$$

In the above equation, C represents a signal value of a color of R, G, or B before a correction, and C' represents a signal value after a correction. a_i is a gain correction value in a region i. EV_i is an exposure value in the region i, and is determined in accordance with the exposure condition set at step S203. EV_0 is an exposure value during the main image capturing, and is determined in accordance with the exposure condition corresponding to the entire main captured image set at step S201. Note that the exposure value EV_0 during the main image capturing can be determined in accordance with the accumulation period, the sensitivity (read gain), and the aperture value as illustrated in FIG. 8 for example.

At step S206, the development processing unit 111 performs the development process on the data having been subjected to the gain correction at step S205. At step S207, the output unit 113 outputs the main captured image data obtained at step S206.

Setting of Exposure Condition for Each Region

Figure 3:
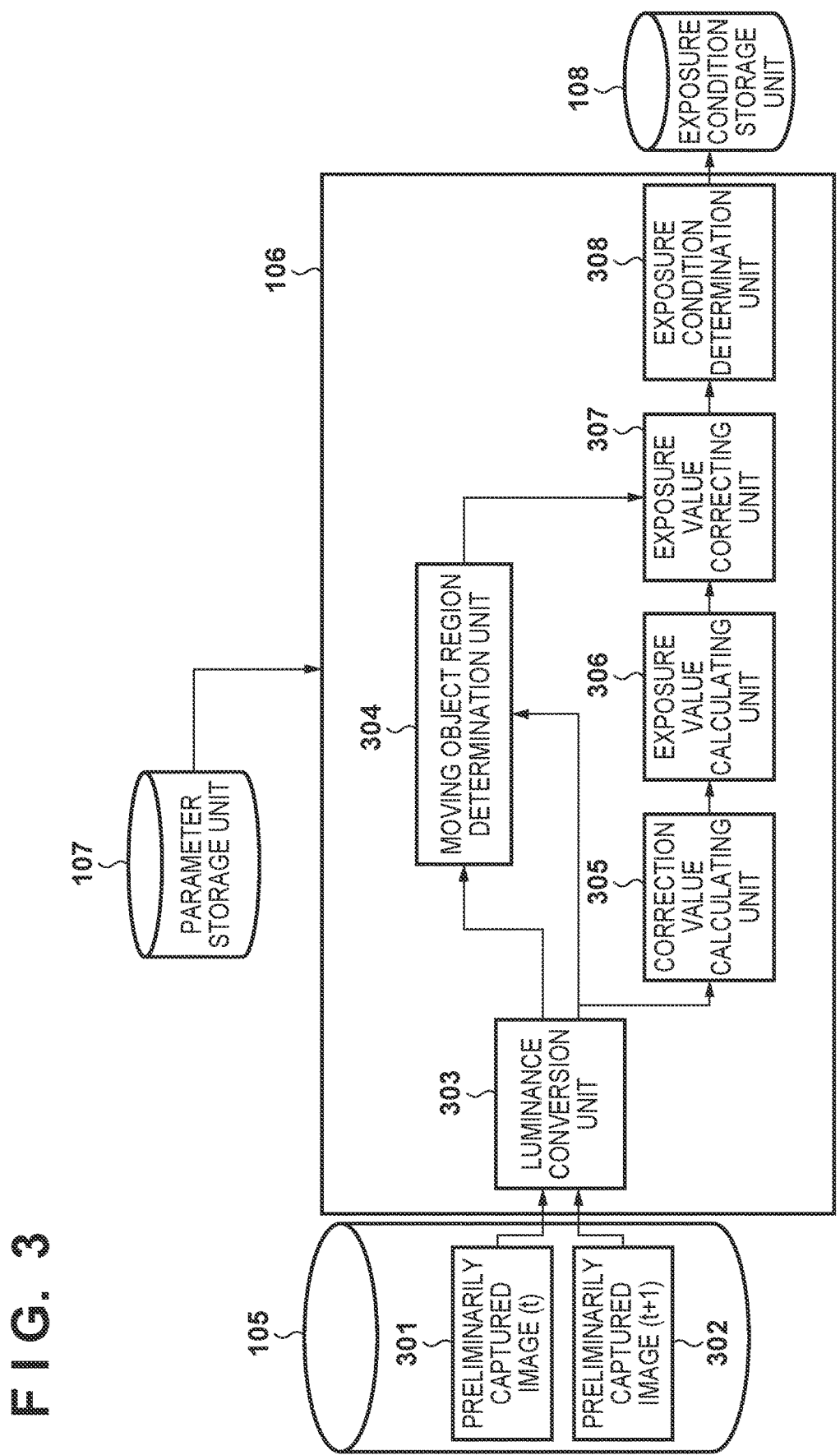
FIG. 3 is a block diagram illustrating an exemplary internal configuration of an exposure condition calculating unit 106.

Next, an exposure condition setting process for regions at step S203 is described. FIG. 3 is a block diagram illustrating an exemplary internal configuration of the exposure condition calculating unit 106. A previous preliminarily captured image (t) 301 and a new preliminarily captured image (t+1) 302 are input to the exposure condition calculating unit 106.

As described above, the exposure condition calculating unit 106 acquires the brightness information of each region within the imaging range of the image capturing unit. The exposure condition calculating unit 106 can acquire the brightness information on the basis of the image obtained by the image capturing unit. While the type of the brightness information is not particularly limited, the luminance value is used as the brightness information in the present embodiment. In addition, in the present embodiment, the exposure condition calculating unit 106 generates the brightness information by using the preliminarily captured image. As a specific configuration for this operation, a luminance conversion unit 303 converts the preliminarily captured image (t+1) 302 to a luminance image. In addition, the luminance conversion unit 303 can convert the preliminarily captured image (t) 301 to a luminance image. Note that the generation of the brightness information on the basis of the image information acquired by the image capturing device 101 may not be essential, and for example, the exposure condition calculating unit 106 may acquire the brightness information obtained by an external measurement device.

Further, the exposure condition calculating unit 106 acquires information representing a moving object region within the imaging range of the image capturing unit. For example, the exposure condition calculating unit 106 can acquire the information representing the moving object region on the basis of a difference between the two images obtained by the image capturing unit. In the present embodiment, the exposure condition calculating unit 106 determines the moving object region by comparing the plurality of preliminarily captured images. Specifically, the exposure condition calculating unit 106 can determine that a region having a large difference between the preliminarily captured images is a moving object region. As a specific configuration for this operation, a moving object region determination unit 304 determines the moving object region by using the preliminarily captured image (t+1) 302 and the preliminarily captured image (t) 301 converted to the luminance image.

Then, by using the information representing the moving object region and the brightness information, the exposure condition calculating unit 106 sets, for each region, the exposure condition used by the image capturing unit. The exposure condition calculating unit 106 can set the exposure condition for each region such that the saturation of the amount of light measured by the image capturing element 103 is suppressed for each region.

In one embodiment, the exposure condition calculating unit 106 switches the exposure condition setting method between a region not in the vicinity of the moving object region and a region in the vicinity of the moving object region. Specifically, the exposure condition for a region not in the vicinity of the moving object region can be set using a first setting method, and the exposure condition for a region not in the vicinity of the moving object region can be set using a second setting method.

While the switching method is not particularly limited, the exposure condition for the region not in the vicinity of the moving object region is determined in accordance with the brightness in that region in the following example. On the other hand, the exposure condition for the region not in the vicinity of the moving object region is set based on the brightness of the surrounding region of that region in addition to the brightness in that region.

As a specific configuration for this operation, a correction value calculating unit 305 calculates the exposure correction value of each region by using the luminance image of the preliminarily captured image (t+1) 302. An exposure value calculating unit 306 calculates the corrected exposure value of each region by using the exposure correction value calculated by the correction value calculating unit 305. Further, an exposure value correcting unit 307 corrects the exposure value in the moving object region by using the information representing the moving object region determined by the moving object region determination unit 304 and the corrected exposure value of each region calculated by the exposure value calculating unit 306. Then, an exposure condition determination unit 308 determines the exposure condition of each region by using the exposure value corrected by the exposure value correcting unit 307, and stores the determined exposure condition in the exposure condition storage unit 108.

Figure 4:
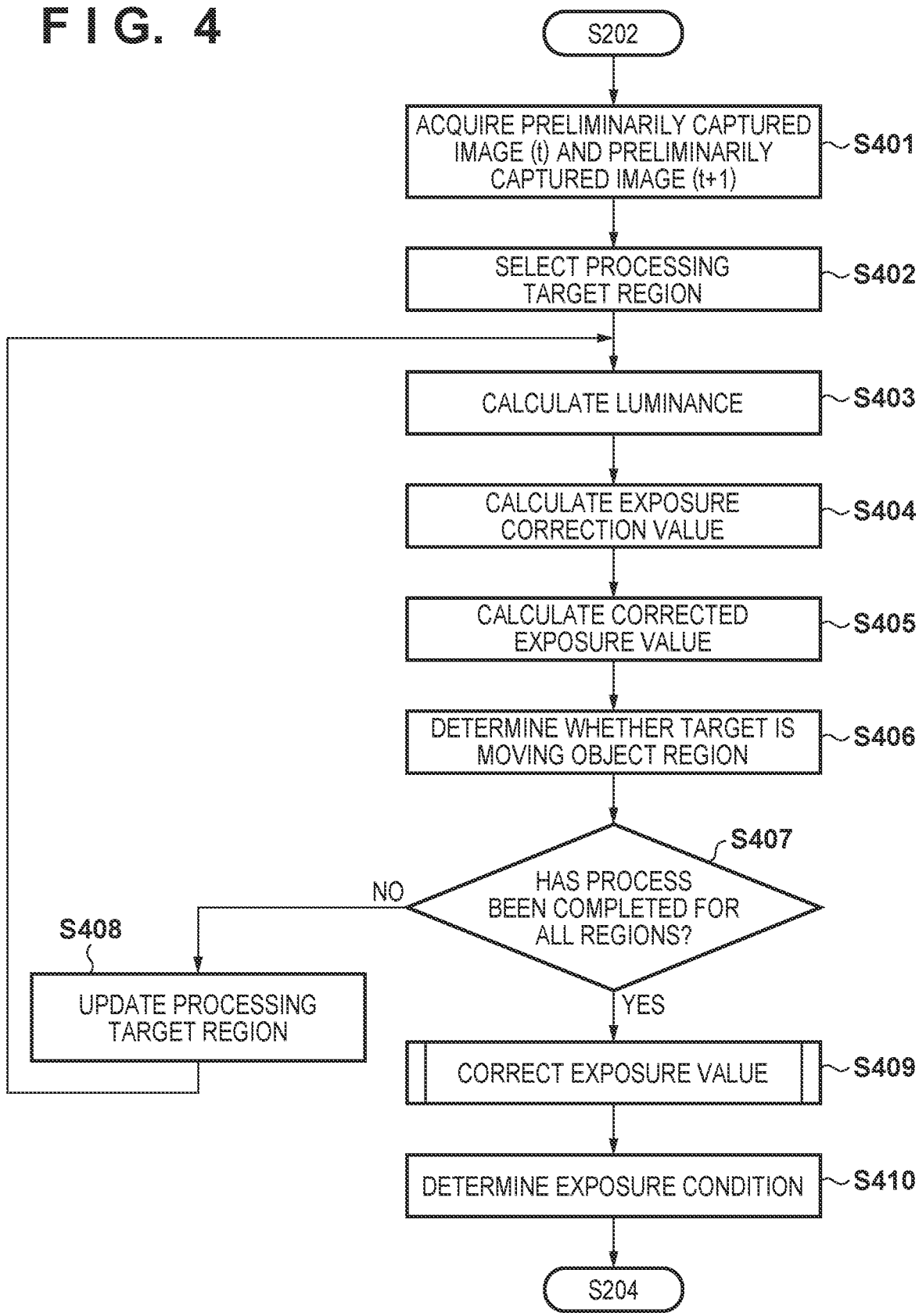
FIG. 4 is a flowchart of an exposure condition calculation process (step S203).

FIG. 4 is a flowchart illustrating details of the exposure condition setting process for each region at step S202. At step S401, the luminance conversion unit 303 acquires the preliminarily captured image (t) and the preliminarily captured image (t+1). At step S402, the luminance conversion unit 303 selects one region of the image capturing element 103 as a processing target region. At steps S403 to 406, one region of the image capturing element 103 is subjected to processes, and the exposure condition for this region is determined. The region whose exposure condition is to be determined is referred to as the processing target region. The processing target region may correspond to a pixel block of the image capturing element 103 to which the same exposure condition is applied, for example. Specifically, in the case where the exposure condition can be controlled for each region composed of a predetermined pixel block (e.g., 64×64 pixels) in the image capturing element 103, each pixel block can be sequentially selected as the processing target region.

At step S403, the luminance conversion unit 303 converts the processing target region of the preliminarily captured image (t) 301 and the preliminarily captured image (t+1) 302 to a luminance image. The method of generating the luminance image is not particularly limited, but, in the case where a captured image having a Bayer structure of RGB is converted to a luminance image for example, a luminance Y for each pixel block of 2×2 pixels included in the processing target region can be calculated using the following equation.

$$Y=0.2126 \times R+0.7152 \times G+0.0722 \times B$$

At step S404, the correction value calculating unit 305 calculates the exposure correction value by using the luminance image of the processing target region of the preliminarily captured image (t+1) obtained at step S403. The exposure correction value is calculated such that an optimal exposure condition can be obtained by changing, in accordance with the exposure correction value, the exposure condition that has been used during the preliminary image capturing. The method of calculating the exposure correction value is not particularly limited. In the present embodiment, the correction value calculating unit 305 calculates the correction value for the exposure value. In this case, the exposure correction value can be calculated according to the following equation. In the following equation, the maximum value of the luminance in the processing target region is represented by Ymax and the maximum value of the luminance in the main captured image is represented by max. When Ymax and max are equal to each other, the processing target region is in a saturated state, and accordingly the EV correction value is increased and an exposure condition for darkly capturing an image is set. On the other hand, in the case where max is Ymax/2 or greater and is less than Ymax, the current exposure condition is maintained. In other cases, the exposure condition is set such that the image is brightly captured.

if (Ymax==max)

EV correction value=1 else if (Ymax/2≤max<Ymax)

EV correction value=0 else

EV correction value=$-\log_2$(max/Ymax)

At step S405, the exposure value calculating unit 306 calculates the corrected exposure value by using the exposure correction value obtained at step S404. The corrected exposure value can be calculated in accordance with the following equation, for example. In the following equation, EVpre is an exposure value corresponding to the exposure condition during the preliminarily image capturing. In addition, EVmax is an exposure value corresponding to a darkest image capturing condition of the image capturing condition that can be set during the main image capturing, and can be determined in accordance with the set aperture value. EVpre and EVmax may be determined in accordance with the relationship of the exposure value, the accumulation period, the sensitivity (read gain), and the aperture value as illustrated in FIG. 8.

EV=EVpre+EV correction value if (EV<1)

EV=1 else if (EV>EVmax)

EV=EVmax

With the above-described configuration, an exposure value suitable for each region can be calculated in accordance with the brightness of the region. To be more specific, the exposure value can be determined so as to increase the amount of measured light while suppressing the saturation of the amount of light measured by the image capturing element 103 for each region. That is, by using the exposure value determined in the above-mentioned manner, the S/N ratio of the signal obtained from the image capturing element 103 can be improved.

At step S406, the moving object region determination unit 304 determines whether the processing target region is a moving object region. The moving object region determination unit 304 can make this determination by using information that reflects changes in the subject in the processing target region. In the present embodiment, the moving object region determination unit 304 determines whether the processing target region is a moving object region on the basis of the difference between the luminance image of the preliminary exposure image (t) 301 and the luminance image of the preliminary exposure image (t+1) 302 in the processing target region. For example, the moving object region determination unit 304 can calculate a movement amount Mi in the processing target region by summing the absolute value of the luminance difference over the processing target region (region i) and by performing a gain process and a threshold process. Then, in the case where the movement amount Mi is greater than a predetermined threshold, the processing target region can be determined to be a moving object region.

The following equation is an exemplary equation for calculating a movement amount Mi.

$$Mi = g \times (\Sigma | Y_{t,i}(j) - Y_{t+1,i}(j) | - Th)$$

In this equation, $Y_{t,i}(j)$ represents the luminance of the preliminarily captured image (t) 301 at a pixel position j of the region i, and $Y_{t+1,i}(j)$ represents the luminance of the preliminarily captured image (t+1) 302 at a pixel position j of the region i. g and Th are parameters for adjusting the error, and are stored in the parameter storage unit 107. The magnitude of the movement amount Mi can be controlled by adjusting g, and the magnitude of the luminance difference for determination as the moving object region can be controlled by controlling Th.

At step S407, the luminance conversion unit 303 determines whether the process has been completed for all regions. When the process has not been completed for all regions, the process proceeds to step S408, and when the process has been completed, the process proceeds to step S409. At step S408, the luminance conversion unit 303 selects a region that has not yet been processed as the processing target region, and thereafter the processes from step S403 to step S406 are repeated.

At step S409, the exposure condition determination unit 308 further corrects the exposure value determined for each region at step S405, in accordance with the determination made by the moving object region determination unit 304. Details of this process will be described later.

At step S410, the exposure condition determination unit 308 determines the exposure condition of each region in accordance with the exposure value of each region after the correction at step S409. Then, the exposure condition determination unit 308 stores the determined exposure condition in the exposure condition storage unit 108. Here, the exposure condition determination unit 308 can determine the exposure or the accumulation period corresponding to the exposure value such that the smaller the exposure value, the greater the exposure or the longer the accumulation period. For example, the exposure condition determination unit 308 may determine the accumulation period corresponding to the exposure value of each region of a case where the aperture value and sensitivity of each region are set at constant values.

While the details of the method of determining the exposure condition is not particularly limited, the exposure condition determination unit 308 can determine the exposure condition of each region with reference to a table defining the accumulation period corresponding to the exposure value as illustrated in FIG. 8, for example. Here, as illustrated in FIG. 8, the exposure condition determination unit 308 may determine the accumulation period corresponding to both the exposure value and the image capturing condition such as the aperture value and the sensitivity (read gain) set at step S201. With such a configuration, the S/N ratio can be improved by increasing the exposure or the accumulation period in a dark region where the exposure value is set at a smaller value. Note that it is not necessary to reduce exposure as the exposure value increases (or as the brightness increases) for all exposure values, in particular for regions with sufficiently large (or bright) exposure values.

Correction of Exposure Value in Moving Object Region

The exposure value correction in the moving object region at step S409 is described in detail with reference to the flowchart of FIG. 10. In the present embodiment, the exposure condition for the region surrounding the moving object region is set based on the brightness of the surrounding region of that region in addition to the brightness of that region. For this setting, the exposure condition (or exposure value) for each region that has been calculated based on the brightness for each region at step S405 can be used, for example. In the following example, the exposure condition for the region surrounding the moving object region is set based on the exposure condition calculated based on the brightness of that region at step S405, and the exposure condition calculated based on the brightness of the surrounding region of that region at step S405.

At step S1001, the exposure condition determination unit 308 acquires a moving object region map and an exposure value map. The moving object region map is information representing whether the region is a moving object region for each region, and has been obtained through the process at step S406. The exposure value map is an exposure value determined for each region in accordance with the brightness information (luminance in the present embodiment) of the region, and has been obtained through the process of step S405.

At step S1002, the exposure condition determination unit 308 selects one region of the image capturing element 103 as the processing target region. Also at step S1006, the exposure condition determination unit 308 selects the processing target region as the processing target region. At steps S1003 to S1005, the processes are performed on one region of the image capturing element 103 thus selected. At steps S1002 and S1006, the exposure condition determination unit 308 can sequentially select each pixel block of the image capturing element 103 as the processing target region as at steps S402 and S408.

At step S1003, the exposure condition determination unit 308 determines whether a moving object region is present in the search range set for the processing target region. The exposure condition determination unit 308 can determine that a moving object region is present when referring to the moving object region map and one or more regions determined as moving object regions are present in the search range. FIG. 9 illustrates an example where a search range 920 is 3×3 blocks around the processing target region 910. FIG. 9 illustrates a moving object region 930. In this example, a region determined as a moving object region is included in the search range 920, and it is therefore determined that a moving object region is present in the search range for the processing target region.

When it is determined at step S1003 that a moving object region is present in the search range for the processing target region, the process proceeds to step S1004. In this case, it has been determined that the processing target region is around the moving object region. At step S1004, the exposure condition whose exposure is smallest in the exposure condition (or the exposure value) of the processing target region calculated at step S405 and the exposure condition of the surrounding region of the processing target region is set as the exposure condition for the processing target region. Thus, the exposure under the exposure condition that is set based on the brightness of the processing target region and is calculated at step S405 for the processing target region is equal to or greater than the exposure under the exposure condition after the correction at step S1004.

Here, the search range may be identical to the surrounding region or different from the surrounding region. For example, the exposure condition determination unit 308 can correct the exposure value of the processing target region such that the value is maximized within the exposure value set in the region within the search range. In this manner, since the exposure value for the region within the search range is set based on the brightness of that region, the exposure condition can be determined in consideration of the brightness of the region within the search range through the above-mentioned process. Thus, even in the case where a bright subject seen in an adjacent region is moved into the processing target region in the moving object region where the amount of light easily varies due to the presence of a moving subject and the like, the exposure is suppressed such that the signal is not saturated due to an excessive amount of light.

On the other hand, in the case where it is determined at step S1003 that no moving object region is present in the search range for the processing target region, the process of replacing the exposure value of the processing target region with the maximum exposure value within the search range, as in step S1004, is not performed. Through the above-mentioned process, in a stationary object region where the amount of light is less likely to change, the amount of light in the processing target region is kept at a value corresponding to the brightness of the processing target region even when a bright subject is present in an adjacent region, and thus the S/N ratio in this region can be maintained at a favorable value.

Figure 6A:
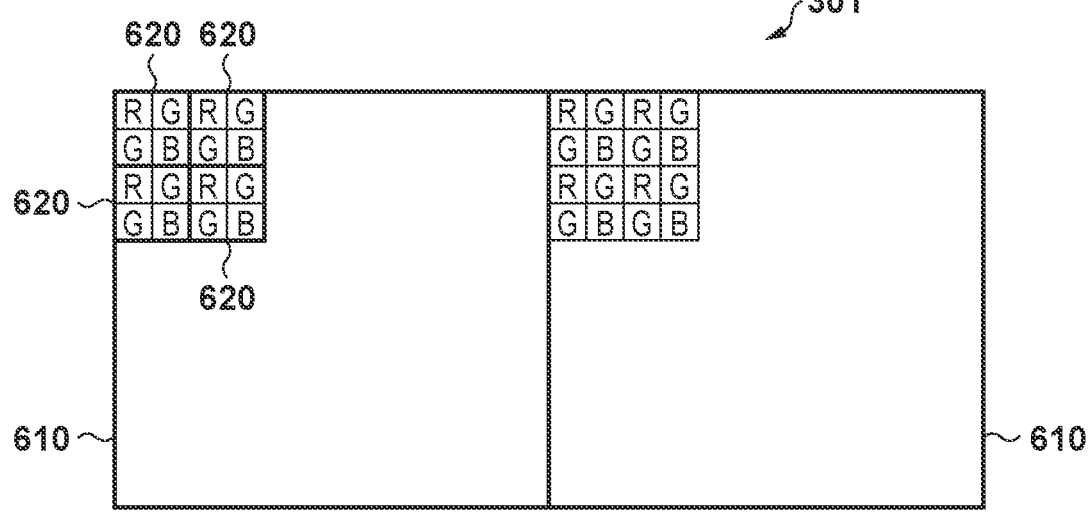
FIGS. 6A to 6C are explanatory diagrams of a method of calculating an exposure value for each region.
Figure 6B:
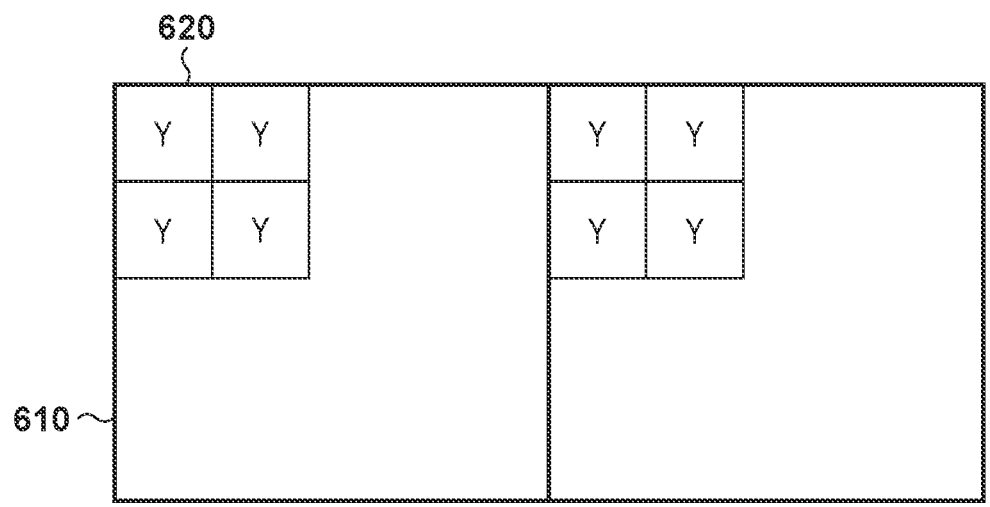
Figure 6C:
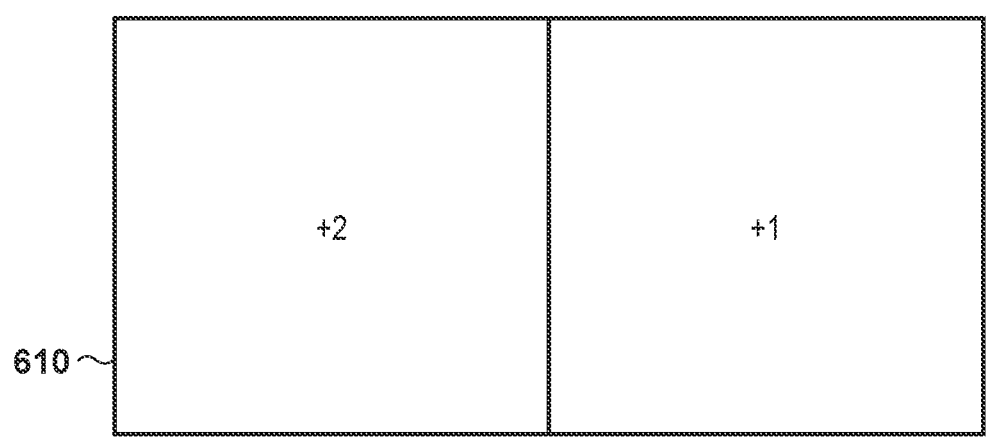

FIGS. 6A to 6C are diagrams schematically illustrating a process of determining the exposure value of each region according to the present embodiment. FIG. 6A is an enlarged view of the preliminarily captured image (t) 301, and illustrates a block 610 of 64×64 pixels serving as one processing target region (only some of the blocks 610 are illustrated in FIG. 6A). Further, the block 610 includes a plurality of blocks 620 of 2×2 pixels composed of one R pixel, two G pixels, and one B pixel (only some of the blocks 620 are illustrated in FIG. 6A). As illustrated in FIG. 6B, the luminance conversion unit 303 calculates the luminance Y for each block 620 of 2×2 pixels. As illustrated in FIG. 6C, the correction value calculating unit 305 calculates the exposure correction value on the basis of the maximum value Ymax of the luminance of the included block 620 for each block 610 of 64×64 pixels. On the basis of the correction value calculated in this manner, the exposure value calculating unit 306 calculates the exposure value for each block 610 of 64×64 pixels.

FIGS. 7A to 7C are diagrams schematically illustrating a process according to the present embodiment in which the exposure condition determination unit 308 corrects the exposure value. FIG. 7A illustrates a moving object region map 710, and FIG. 7B illustrates an exposure value map 720. In FIGS. 7A and 7B, one square corresponds to the block 610 of 64×64 pixels. In addition, in FIG. 7A, the hatching portion represents a moving object region. Further, in FIG. 7B, the exposure value calculated by the exposure value calculating unit 306 is shown in each block 610. FIG. 7C illustrates an exposure value map 730 after the exposure value has been corrected by the exposure condition determination unit 308. As illustrated in FIG. 7C, in the region near the moving object region (the left side of FIG. 7B), the exposure value is replaced with the maximum exposure value within the search range. On the other hand, in regions not in the vicinity of the moving object region (the right side of FIG. 7B), the exposure value is not changed although there are some regions having small exposure values.

According to the image capturing device according to the present embodiment, the method of determining the exposure condition of each region is switched based on information representing the moving object region. Thus, while performing the exposure control in the stationary object region on the basis of the brightness of the own region so as to obtain a favorable S/N ratio, the exposure control can be performed in the region near the moving object region in consideration of the brightness of the adjacent region so as not to cause blown-out highlight. Thus, even when there is a time difference between the preliminary image capturing and the main image capturing for determining the exposure condition, the S/N ratio can be maintained while reducing blown-out highlight.

Embodiment 2

In Embodiment 1, the exposure condition of each region is determined based on the result of the preliminary image capturing. In Embodiment 2, the exposure condition is determined using a frame image of a movie instead of using the result of the preliminary image capturing. Specifically, the brightness information and the information representing the moving object region are obtained by using a frame image constituting a movie captured by the image capturing unit, and the image capturing condition for each region is set based on the information. Points different from Embodiment 1 are described below.

At step S201, the control unit 104 sets a reference image capturing condition in place of the image capturing condition used in the preliminary image capturing. In addition, at step S202, the control unit 104 starts capturing of a movie in accordance with the image capturing condition set at step S201.

At step S203, the exposure condition calculating unit 106 sets an exposure condition of each region for obtaining a frame image t, and stores the exposure condition in the exposure condition storage unit 108. In the present embodiment, the exposure condition for the frame image t is set by using a second previous frame image t−2 and a previous frame image t−1 in place of the two preliminarily captured images.

At step S204, the control unit 104 performs image capturing in accordance with the exposure condition of each region stored in the exposure condition storage unit 108. Thereafter, the frame image t is obtained by performing the processes at steps S205 to 207 as in Embodiment 1. Thereafter, the control unit 104 determines whether to terminate the image capturing. When the image capturing is not to be terminated, the processes after step S203 are repeated.

According to the processes of Embodiment 2, the same effects as those of Embodiment 1 can be obtained also when capturing a movie.

Other Embodiments

In Embodiments 1 and 2, the method of setting the exposure condition is switched between a region where a moving object region is present in the vicinity and a region where a moving object region is not present in the vicinity. However, the use of the information representing the moving object region is not limited to this specific example. For example, depending on applications, the method of setting the exposure condition may be switched between a processing target region belonging to a moving object region and a processing target region belonging to a stationary object region.

In addition, in Embodiments 1 and 2, the exposure condition for the processing target region where no moving object region is present in the vicinity is determined based on the brightness of the processing target region, whereas the exposure condition for the processing target region where the moving object region is present in the vicinity is determined further in consideration of the brightness of the region within the search range. However, the method of determining the exposure condition is not limited to this specific example. For example, the correspondence relationship between the exposure value determined by the exposure value calculating unit 306 on the basis of the brightness of the processing target region and the exposure condition for the processing target region may be different between the processing target region where the moving object region is present in the vicinity and the processing target region where the moving object region is not present in the vicinity. As an example, the exposure condition determination unit 308 can determine the exposure condition for a processing target region where no moving object region is present in the vicinity from the exposure value by using a table such as that of FIG. 8 illustrating a correspondence relationship between the exposure value and the exposure condition. In addition, the exposure condition determination unit 308 can determine the exposure condition for a processing target region where the moving object region is present in the vicinity from the exposure value by using a table separately prepared for the region where the moving object region is present in the vicinity. In this case, for example, the table for the region where the moving object region is present in the vicinity can define the exposure condition such that the exposure obtained under the exposure condition corresponding to at least one exposure value is smaller than in the table for the region where the moving object region is not present in the vicinity. Such a configuration also allows for maintaining the S/N ratio while reducing the blown-out highlight near the moving object region.

Further, while the moving object region is determined based on the difference in the images in Embodiments 1 and 2, the method of determining the moving object region is not limited to this method. For example, the moving object region may be determined by using a block search and the like. In addition, while the exposure condition calculating unit 106 acquires the information representing the moving object region by using the image acquired by the image capturing unit of the image capturing device 101 in Embodiments 1 and 2, this configuration may not be essential, and for example, information representing a moving object region obtained by an external measuring device may be acquired.

In particular, in the case where a determination method capable of determining the movement direction is used, the exposure condition can be set in consideration of the movement direction. For example, the search range may be set in accordance with the movement direction, and as a specific example, a search range including a region in a direction opposite to the movement direction from the processing target region may be set. Also, the exposure condition of the processing target region may be replaced with an exposure condition corresponding to the movement direction. As a more specific example, in Embodiments 1 and 2, a region where a movement of the subject toward the processing target region is detected in the region within the search range corresponding to the processing target region can be selected as the selection region. In this case, at step S1004, the exposure value of the processing target region can be corrected such that the value is a maximum value of the exposure value set to the selection region. By further considering the direction of movement of the subject in the above-mentioned manner, a region where the brightness possibly changes can be specified in more detail in the region where the moving object region is present in the vicinity. It is thus possible to further limit the region whose exposure is reduced to reduce the blown-out highlight, and a more favorable S/N ratio can be maintained.

In the above-described embodiments, each processing unit illustrated in FIG. 1 for example is implemented by dedicated hardware. However, some or all of the processing units included in the image capturing device 101 may be implemented by a computer. In one embodiment, the image capturing device includes a computer, i.e., a processor and a memory, in addition to the optical system 102 and the image capturing element 103, and at least a portion of the processes according to the above-mentioned embodiments is executed by the computer.

Figure 5:
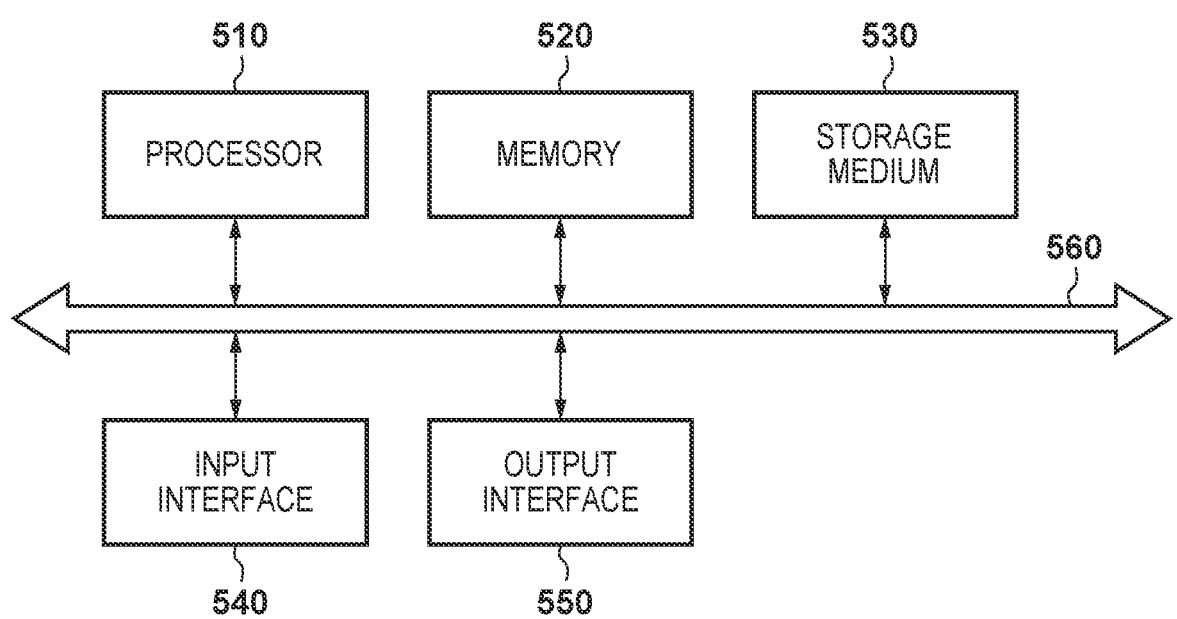
FIG. 5 is a block diagram illustrating an exemplary configuration of a computer according to one embodiment.

FIG. 5 illustrates a basic configuration of such a computer. In FIG. 5, a processor 510 is, for example, a CPU and controls the operation of the entire computer. A memory 520 is, for example, a RAM and temporarily stores programs, data and the like. A computer readable storage medium 530 is, for example, a hard disk, a CD-ROM or the like, and stores programs, data and the like over a long period of time. In the present embodiment, programs for implementing the functions of each unit stored in the storage medium 530 are read into the memory 520. Then, the processor 510 operates in accordance with a program on the memory 520 to implement the functions of each unit.

In FIG. 5, input interface 540 is interface for acquiring information from an external device. Output interface 550 is interface for outputting information to an external device. A bus 560 connects between the above-described units, and enables data exchange.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-232835, filed Dec. 12, 2018, which is hereby incorporated by reference herein in its entirety.

What is claimed is:

1. An image capturing device comprising:
one or more processors and one or more memories, configured to function as a plurality of units comprising:
an image capturing unit capable of controlling an exposure condition for each region;
a first acquisition unit configured to acquire information representing a moving object region within an imaging range of the image capturing unit;
a second acquisition unit configured to acquire brightness information of each region within the imaging range of the image capturing unit; and
a setting unit configured to set the exposure condition to be used by the image capturing unit for the each region by using the information representing the moving object region and the brightness information,
wherein the exposure condition for a target region which is not in a vicinity of the moving object region is set based on the brightness information for the target region, and
wherein the exposure condition for a target region which is in a vicinity of the moving object region is set based on the brightness information for the target region and the brightness information for a surrounding region of the target region.

2. The image capturing device according to claim 1, wherein
the setting unit is further configured to set the exposure condition for the region not in the vicinity of the moving object region by using a first setting method, and set the exposure condition for the region in the vicinity of the moving object region by using a second setting method different from the first setting method.

3. The image capturing device according to claim 2, wherein in the second setting method, an exposure condition whose exposure is smallest in the exposure condition for the region obtained by the first setting method and the exposure condition for the surrounding region of the region obtained by the first setting method is set as the exposure condition for the region.

4. The image capturing device according to claim 2, wherein an exposure under the exposure condition obtained by the first setting method for the region is equal to or greater than an exposure under the exposure condition obtained by the second setting method.

5. The image capturing device according to claim 1, wherein the exposure condition for the target region which is in the vicinity of the moving object region is set based on an exposure condition determined based on the brightness information for the target region and an exposure condition determined based on the brightness information for the surrounding region of the target region.

6. The image capturing device according to claim 1, wherein the setting unit is further configured to set the exposure condition for the region such that saturation of an amount of light measured by the image capturing unit in the region is suppressed.

7. The image capturing device according to claim 1, wherein the setting unit is further configured to control a charge accumulation period of an image capturing element included in the image capturing unit as the exposure condition.

8. The image capturing device according to claim 7, wherein the setting unit is further configured to control, for each region, a gain applied to a signal from the image capturing element included in the image capturing unit.

9. The image capturing device according to claim 1, wherein the first acquisition unit is further configured to acquire the information representing the moving object region by using an image obtained by the image capturing unit.

10. The image capturing device according to claim 9, wherein the first acquisition unit is further configured to acquire the information representing the moving object region on a basis of a difference between two images obtained by the image capturing unit.

11. The image capturing device according to claim 9, wherein the image obtained by the image capturing unit is an image captured by the image capturing unit by using an identical exposure condition for each region.

12. The image capturing device according to claim 9, wherein the image acquired by the image capturing unit is a frame image constituting a movie captured by the image capturing unit.

13. The image capturing device according to claim 1, wherein the second acquisition unit is further configured to acquire the brightness information by using an image obtained by the image capturing unit.

14. The image capturing device according to claim 1, wherein
the setting unit is further configured to set the exposure condition for a region not in the moving object region by using a first setting method, and set the exposure condition for a region in the moving object region by using a second setting method different from the first setting method.

15. The image capturing device according to claim 14, wherein
in the first setting method, the exposure condition for the region is set based on a brightness of the region, and
in the second setting method, the exposure condition for the region is set based on a brightness of a surrounding region of the region in addition to the brightness of the region.

16. A control method of an image capturing device, comprising:
acquiring information representing a moving object region within an imaging range of the image capturing device, the image capturing device capable of controlling an exposure condition for each region;
acquiring brightness information of each region within the imaging range of the image capturing device; and
setting the exposure condition to be used by the image capturing device for the each region by using the information representing the moving object region and the brightness information, wherein the exposure condition for a target region which is not in a vicinity of the moving object region is set based on the brightness information for the target region, and wherein the exposure condition for a target region which is in a vicinity of the moving object region is set based on the brightness information for the target region and the brightness information for a surrounding region of the target region.

17. A non-transitory computer-readable medium storing a program which, when executed by a computer comprising a processor and a memory, causes the computer to perform:

acquiring information representing a moving object region within an imaging range of an image capturing device, the image capturing device capable of controlling an exposure condition for each region;

acquiring brightness information of each region within the imaging range of the image capturing device; and setting the exposure condition to be used by the image capturing device for the each region by using the information representing the moving object region and the brightness information wherein the exposure condition for a target region which is not in a vicinity of the moving object region is set based on the brightness information for the target region, and wherein the exposure condition for a target region which is in a vicinity of the moving object region is set based on the brightness information for the target region and the brightness information for a surrounding region of the target region.

18. An image capturing device comprising:

one or more processors and one or more memories, configured to function as a plurality of units comprising:

an image capturing unit capable of controlling an exposure condition for each region; and a setting unit configured to set the exposure condition to be used by the image capturing unit for the each region by using information representing a moving object region and brightness information, wherein the exposure condition for the moving object region is set based on the brightness information for the moving object region, wherein the exposure condition for a surrounding region, the surrounding region surrounding the moving object region, is set based on the exposure condition for the moving object region, an exposure condition for a surrounding region of the moving object region and the brightness information.

* * * * *